Feb. 16, 1960    N. FREEMAN    2,925,108
ADJUSTABLE DADO CUTTER
Filed Dec. 23, 1957
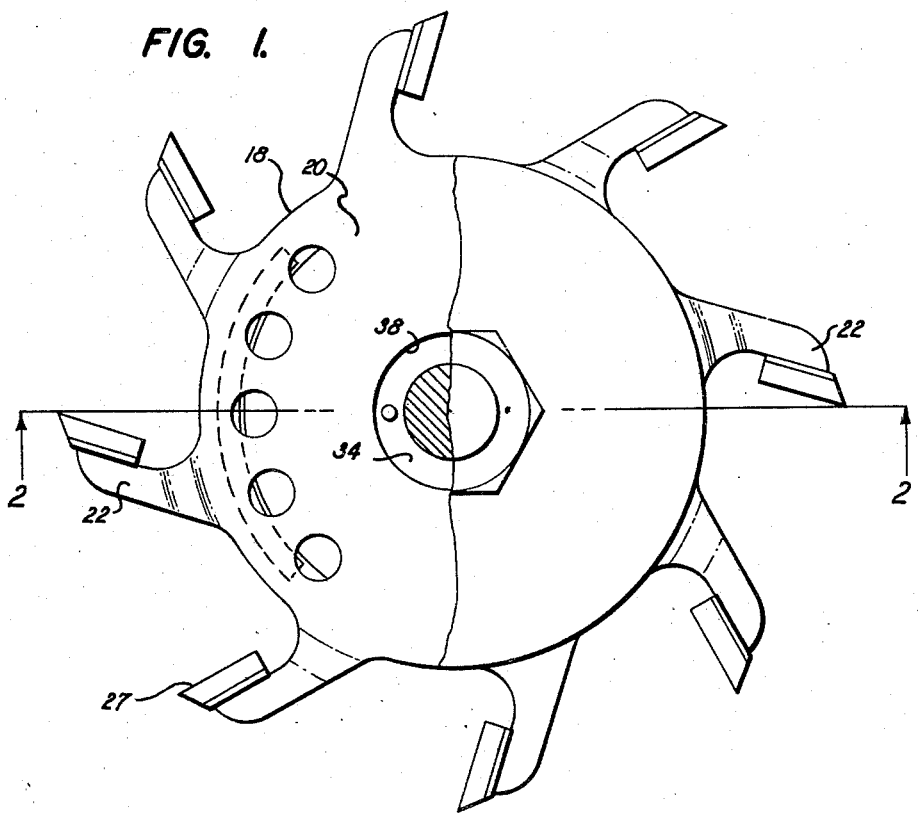
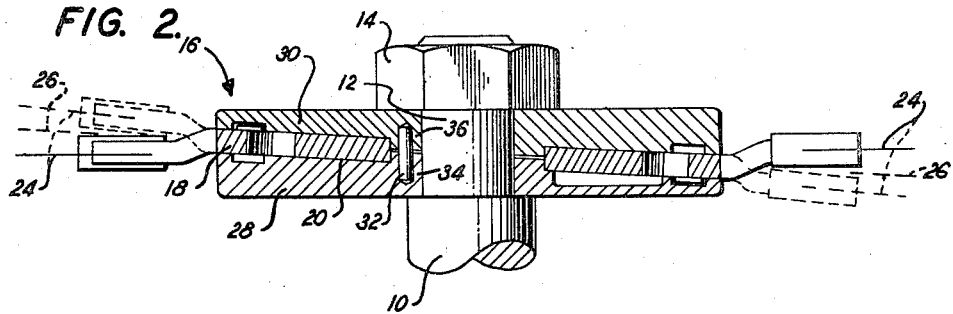
INVENTOR.
NORRIS FREEMAN
BY
Christie, Parker & Hale
ATTORNEYS

United States Patent Office 2,925,108
Patented Feb. 16, 1960

2,925,108

ADJUSTABLE DADO CUTTER

Norris Freeman, Inglewood, Calif., assignor to The Siegler Corporation, Anaheim, Calif., a corporation of Delaware Application December 23, 1957, Serial No. 704,556

2 Claims. (Cl. 144—239)

This invention relates to dado cutters, and more particularly, is concerned with such a cutter which is adjustable.

Dado cutters are well known in the art by means of which grooves can be cut in a work piece, the grooves being wider than the cutting tips of the tool. Such a cutter is provided by mounting a saw blade at an angle with respect to its axis of rotation so that the saw teeth are displaced axially as the blade rotates. The extent of the axial displacement depends upon the inclination of the saw blade to the axis of rotation. Because of their wobble action, such tools are frequently referred to as "wobble saws." The trouble with the wobble saw is that it is dynamically unbalanced, producing excessive vibration when rotated at high speed.

While various arrangements have heretofore been proposed for making the wobble saw adjustable and for improving its dynamic balance, such known tools have been complicated and costly to construct. By the present invention an adjustable dado cutter providing good dynamic balance is provided which is more rugged in construction, simpler to build and construct, and less expensive to fabricate.

In brief, the invention contemplates a cutter tool comprising a single relatively thin circular plate having a circular central disc portion lying in one plane, and a plurality of projecting teeth around the outer periphery of the central disc portion, the teeth being offset by varying amounts with respect to the plane of the disc and in turn lying in a common plane which intersects the plane of the central disc portion at an angle, the line of intersection extending through the center of the disc portion. Two wedge-shaped clamping plates having substantially the same diameter as the disc portion of the plate are clamped on either side of the plate to hold the plate in any predetermined position for rotation. Cutter bits are secured to the projecting teeth to form the cutting edges.

For a better understanding of the invention, reference should be had to the accompanying drawing, wherein:

Fig. 1 is an end view, partially in section, of a cutting tool in accordance with the present invention; and Fig. 2 is a sectional view taken substantially on the line 2—2 of Fig. 1.

Referring to the figures in detail, the numeral 10 indicates generally a portion of a shaft which may be rotatably driven from a suitable power means, such as an electric motor (not shown). The shaft preferably includes a reduced diameter portion 12 which is threaded at the outer end to receive a clamping nut 14. The cutting tool, indicated generally at 16, is carried on the reduced diameter portion 12 of the shaft 10. Tightening of the nut 14 secures the cutting tool 16 on the shaft 10 for rotation thereby.

The cutting tool 16 consists of a plate member 18. The member 18 is formed, as by a suitable blanking and offsetting die, with a central disc portion 20 and a plurality of projecting teeth 22. The projecting teeth are offset by varying amounts from the plane of the central disc portion, as best seen in Fig. 2. All the projecting teeth are offset so as to lie substantially in a common plane, the plane being indicated by the dash centerline 24 in Fig. 2. This plane is inclined at an angle to the plane of the disc portion 20 of the plate 18, as indicated by the dash line 26. It will be noted that the two planes intersect in a line which passes at right angles through the axis of rotation of the shaft 10. Cutter bits 27 are brazed or otherwise secured to the projecting teeth, in the manner indicated in the drawings, for providing suitable cutting edges.

The plate 18 is held between two clamping discs 28 and 30. The clamping discs are each provided with a central opening through which the reduced diameter portion 12 of the shaft 10 extends. The interfaces of the clamping discs 28 and 30 which engage the disc portion 20 of the plate 18 are faced off with planar surfaces that extend at an angle with respect to the axis of rotation of the shaft 10. In other words, the discs 28 and 30 are wedge-shaped. The thickest portion of the wedge-shaped clamping disc 28 is angularly positioned opposite the thinnest portion of the wedge-shaped clamping disc 30, the two discs being held in this angular relationship by means of a dowel pin 32 which engages suitable holes drilled in opposing surfaces of the two clamping discs.

The clamping discs are provided with central hub portions 34 and 36 respectively, which project toward each other in the region of the shaft 10. The hubs extend through a circular aperture 38 in the center of the plate 18, the hub portions of the clamping discs forming a circular shoulder which slidably engages the aperture 38 whereby the plate 18 can be rotated about the axis of rotation of the shaft 10 between and relative to the two clamping discs 28 and 30.

It will be seen that by making the angle of inclination of the interfaces of the clamping discs 28 and 30 relative to a plane perpendicular to the axis of rotation of the shaft 10 equal to the angle of inclination between the planes 24 and 26 between the disc portion 20 of the plate 18 and the offset teeth 22, the plane of the projecting teeth 22 can be made perpendicular to the axis of rotation of the shaft 10. This condition is illustrated in Fig. 2. In other words, the offset of the projecting teeth 22 is completely compensated for by the offset of the plane of the disc portion 20 as it is held between the clamping discs 28 and 30. If then the plate 18 is rotated relative to the clamping discs 28 and 30 through, for example, 180°, the plane of the projecting teeth 22 will be inclined at twice the angle of inclination between the planes 24 and 26 from the plane normal to the axis of rotation of the shaft 10. This condition is indicated by the dotted lines in Fig. 2.

From the above description it will be seen that a dado tool is provided which is adjustable for making cuts of varying width. Only the teeth with their associated cutter bits constitute a source of dynamic unbalance, since the clamping discs and central disc portion form a symmetrical hub which is completely balanced. Since the teeth with their cutter bits represent only a small portion of the total mass of the tool, they do not result in objectionable dynamic unbalance, and the tool can be rotated at ordinary rotary power saw speeds without undue vibration. Weight may be removed from the plate 18 for achieving proper balance by drilling holes, such as the five shown on one side of the plate in Fig. 1.

I claim:

1. An adjustable dado cutter assembly comprising a relatively thin centrally apertured single metallic circular plate having a substantially circular central disc portion and having a purlity of integrally formed radially projecting teeth around the outer periphery, the projecting teeth lying in one common plane and the central disc portion lying in a second plane, the two planes intersecting at a slight angle to each other in a line extending through the center of the disc portion, a cutting bit on each of said projecting teeth, a pair of wedge-shaped circular clamping discs having substantially the same diameter as the disc portion of the plate, the clamping discs being positioned respectively on either side of the plate and having central hub portions projecting toward each other through the central aperture of the plate, means engaging the two clamping discs to hold them against relative rotation with the thickest portion of the one wedge-shaped clamping disc being angularly positioned opposite the thinnest portion of the other wedge-shaped clamping disc, the clamping discs having aligned openings through the hub portions thereof for receiving a shaft to apply rotation to the cutter assembly, and means for clamping the plate between the clamping discs to secure the plate in any predetermined angular position relative to the clamping discs, whereby the plane of the projecting teeth may be adjusted and held to a predetermined angle with respect to a plane extending perpendicular to the axis of rotation of the cutter assembly.

2. An adjustable dado cutter assembly comprising a relatively thin centrally apertured single metallic circular plate having a substantially circular central disc portion and having a plurality of integrally formed radially projecting teeth around the outer periphery, the projecting teeth lying in one common plane and the central disc portion lying in a second plane, the two planes intersecting at a slight angle to each other, a pair of wedge-shaped circular clamping discs, the clamping discs being positioned respectively on either side of the plate, means engaging the two clamping discs to hold them against relative rotation with the thickest portion of the one wedge-shaped clamping disc being angularly positioned opposite the thinnest portion of the other wedge-shaped clamping disc, and means for clamping the plate between the clamping discs to secure the plate in any predetermined angular position relative to the clamping discs, whereby the plane of the projecting teeth may be adjusted and held to a predetermined angle with respect to a plane extending perpendicular to the axis of rotation of the cutter assembly.

References Cited in the file of this patent

UNITED STATES PATENTS

| | | |
|---|---|---|
| 447,716 | Fox | Mar. 3, 1891 |
| 2,683,476 | Courcier | July 13, 1954 |
| 2,701,134 | Klicpera | Feb. 1, 1955 |
| 2,845,102 | Woodell | July 29, 1958 |